United States Patent [19]

Pcolinsky et al.

[11] Patent Number: 5,447,963
[45] Date of Patent: Sep. 5, 1995

[54] METHOD FOR REDUCING VOLATILE EMISSIONS GENERATED DURING THE PREPARATION OF FOAMS AND FABRICATION OF FOAM PRODUCTS

[75] Inventors: Michael Pcolinsky, Hazleton; Steven Lichvar, Drifton; Herman Stone, Hazleton, all of Pa.

[73] Assignee: PMC, Inc., Sun Valley, Calif.

[21] Appl. No.: 291,658

[22] Filed: Aug. 17, 1994

Related U.S. Application Data

[63] Continuation-in-part of Ser. No. 275,122, Jul. 14, 1994.

[51] Int. Cl.⁶ ............................................... C08J 9/36
[52] U.S. Cl. ................................. 521/130; 521/114; 521/155; 521/918
[58] Field of Search ........................ 521/114, 918, 130

[56] References Cited

U.S. PATENT DOCUMENTS

| | | |
|---|---|---|
| 2,833,730 | 5/1958 | Barthel, Jr. et al. . |
| 3,061,885 | 11/1962 | Rogers, Jr. . |
| 3,227,666 | 1/1966 | Showalter et al. . |
| 3,640,829 | 2/1972 | Elton . |
| 3,644,229 | 2/1972 | Butler et al. . |
| 3,770,537 | 11/1973 | Elton . |
| 3,890,414 | 6/1975 | Ricciardi et al. . |
| 4,021,379 | 5/1977 | Chaya et al. . |
| 4,032,481 | 6/1977 | Pillar . |
| 4,185,146 | 1/1980 | Burke . |
| 4,287,307 | 9/1981 | Hostettler . |
| 4,376,833 | 3/1983 | Ferretti . |
| 4,383,050 | 5/1983 | Nissen et al. . |
| 4,537,912 | 6/1985 | Griswold . |
| 4,587,273 | 5/1986 | Shimomura . |
| 4,775,558 | 10/1988 | Haas et al. . |
| 4,826,882 | 5/1989 | Bredbenner et al. . |
| 4,892,891 | 1/1990 | Close . |
| 4,906,672 | 3/1990 | Stone et al. . |
| 4,950,695 | 8/1990 | Stone . |
| 4,966,920 | 10/1990 | Gainer et al. . |
| 5,006,569 | 4/1991 | Stone . |
| 5,123,936 | 6/1992 | Stone et al. . |
| 5,128,379 | 7/1992 | Stone . |
| 5,135,961 | 8/1992 | Feske . |
| 5,223,552 | 6/1993 | Reinink . |
| 5,229,428 | 7/1993 | Bayer . |

*Primary Examiner*—Morton Foelak
*Attorney, Agent, or Firm*—Leydig, Voit & Mayer, Ltd.

[57] ABSTRACT

Methods for reducing the quantity of emissions emanating from a foam-forming composition during the preparation of a fully-cured foam comprising contacting emissions emanating from the foam-forming composition during preparation of the fully-cured foam with vegetable oil. A further aspect provides a method for reducing the quantity of emissions emanating from a fully-formed foam during hot processing of the foam comprising contacting emissions emanating from the foam during such hot processing with vegetable oil.

26 Claims, No Drawings

METHOD FOR REDUCING VOLATILE EMISSIONS GENERATED DURING THE PREPARATION OF FOAMS AND FABRICATION OF FOAM PRODUCTS

RELATED APPLICATIONS

This application is a continuation-in-part of U.S. Ser. No. 08/275,122, filed Jul. 14, 1994, entitled "Methods For Preparing Flexible, Open-Celled, Polyester And Polyether Urethane Foams And Foams Prepared Thereby."

TECHNICAL FIELD OF THE INVENTION

The present invention relates to a method for reducing volatile emissions generated during the preparation of foams and fabrication of foam products.

BACKGROUND OF THE INVENTION

The preparation of foams requires the use of a number of materials that are hazardous to both the environment and persons who are exposed to these materials. Of further concern are the emissions that are generated when these foams are heated after their preparation, e.g., during the preparation of foam products.

For example, in the preparation of polyurethane foams, the composition from which the foam is prepared includes isocyanates and a variety of other harmful organic components. Therefore, from the time the foam-forming process begins (by depositing the composition onto a substrate), the air about the composition is contaminated with volatile, vaporous organic components. Moreover, and as the foam is being prepared, new compounds produced from the reaction of certain of the foam-forming components will also be released into the air. Further, as the composition completes its rise and reaches a self-sustaining configuration, a smoke will emanate from the foam, further contaminating the surrounding environment.

The generation of that smoke during foam preparation, and its general content, are well known and appreciated by those skilled in the art. The smoke will generally comprise visible vapors and particulate matter up to about 5 microns in average diameter, as well as certain invisible vapors and gases, e.g., toluene diisocyanate, moisture, and carbon dioxide. The precise content of the smoke, of course, as will be readily appreciated, will vary depending upon the particular foam being prepared.

After the foam is fully-formed, it may be further processed to provide a foam product. Examples of such processes that are typically used to provide such products include flame lamination, heat compression, hot wire cutting, heat skinning, and heat lamination. All of these processes require the application of heat to the foam. The application of such heat, however, results in the generation of hazardous emissions which may include carbon monoxide, aldehydes, and hydrocarbons. While the precise composition of such hazardous emissions will, as expected, vary with regard to the particular foam being processed and processing conditions, several are similar to the emissions present in the smoke generated during the preparation of the form. By way of example, in the case of a polyurethane foam, isocyanates and antioxidants would likely be present in emissions generated during both foam preparation and fabrication.

In order to maintain the air quality in the foam production facility during preparation of the foam, the foam production line is typically at least partially enclosed along its top and sides. An exhaust air stream is then drawn over the line to collect the emissions emanating from the foam during its production. This stream of exhaust air is then either discharged into the atmosphere directly or is treated, in order to lower the level of emissions entering the atmosphere.

One method, and related apparatus, that has been proposed for removing, from an exhaust air stream, the fine particulate matter and vapor released during foam preparation is provided by U.S. Pat. No. 5,123,936. More specifically, that method and apparatus are said to provide for the treatment of an exhaust stream which comprises particulate matter and vapor that has been generated during one particular stage of foam preparation, i.e., during the "rapid cooling" of the foam. This rapid cooling procedure is employed at the end of the foam-forming reaction to avoid heat degradation in, and improve uniformity of, the physical properties of the foam. The treatment employs the use of a water spray of fine droplets and a water-wetted mechanical filtration system which function to reduce the level of impurities in the exhaust air stream.

U.S. Pat. No. 5,223,552 provides another method, and related apparatus, for removing particulate matter and vapors generated when accelerating the cooling of a foam after it has completed its rise. This method comprises collecting the emissions generated during that phase of foam production in an exhaust air stream, and then passing that air stream through at least one bed containing activated carbon char or activated charcoal to remove the emissions from the air stream. One problem inherent with this method and apparatus is that the presence of moisture is said to have a deleterious effect upon the operation of the activated bed. Thus, if moisture in that air were to condense, it would have to be removed from the air prior to the introduction of the air stream into the treatment bed.

U.S. Pat. No. 4,966,920 discloses yet another means for reducing the level of contaminants in an air stream. However, this method is directed toward suppressing the formation of smoke and gases which typically emanate from natural or synthetic polymer materials during their combustion (burning). This method is said to be particularly applicable when materials containing isocyanate components are burned, e.g., polyurethane foams. The method itself comprises combining a combustible material containing urethane linkages with, as a smoke and toxic gas suppressant, a particular class of polyester during the manufacture of the foam. These polyesters are said to act alone to suppress the amount of smoke and gas emitted during the combustion of a foam prepared using those polyesters. No other components are required to be added to accomplish this suppression.

In view of the foregoing, it is an object of the present invention to provide a method for reducing the quantity of emissions emanating from foam-forming compositions during the preparation of foams from such compositions.

Another object of the present invention is to provide a method for reducing the quantity of emissions emanating from fully-formed foams during hot processing of such foams.

It is a further object of the present invention that the reduction of those emissions be attained at a relatively low cost.

Yet another object of the present invention is to reduce those emissions using materials that are not harmful to either the persons who work closely with those materials or the environment.

A further object of the present invention is to provide a method for reducing such emissions which is not affected by the presence of moisture in the air in which the emissions are carried.

These and other objects and advantages of the present invention, as well as additional inventive features, will be apparent from the description of the invention provided herein.

SUMMARY OF THE INVENTION

The present invention is predicated on the discovery that vegetable oils are able to reduce the quantity of emissions emanating from a foam-forming composition during the preparation of a fully-formed foam, as well as the quantity of emissions emanating from a fully-formed foam when such foam is subjected to high temperatures, such as during hot processing. In particular, when those emissions come into contact with the vegetable oil, the level of emissions commonly associated with the preparation and processing of foams is, surprisingly, significantly lowered. This contact is advantageously made by passing an exhaust gas stream which includes such emissions through a porous structure which contains the vegetable oil.

One advantage of the method of the present invention is that the reduction in emissions can be accomplished using a material that is both readily available and relatively low in cost. Further, and significantly, the use of vegetable oil in the manner of the present invention offers a means by which the purity level of an effluent gas laden with those emissions can be enhanced without using a material that is hazardous to either the users of the method or the environment.

In accordance with one aspect of the present invention, a method is provided for reducing emissions emanating from a foam-forming composition during the preparation of a fully-formed foam. The method comprises contacting those emissions with vegetable oil.

Another aspect of the present invention provides a method for reducing emissions emanating from a fully-formed foam during hot processing of the foam. This method also comprises contacting those emissions with vegetable oil.

DESCRIPTION OF THE PREFERRED EMBODIMENTS

The method of the present invention may be conveniently segregated, for purposes of discussion, into two aspects. The first aspect provides a method for reducing the quantity of emissions emanating from a foam-forming composition during the time a fully-cured foam is prepared from that composition. The second aspect provides a method for reducing the quantity of emissions emanating from a fully-formed foam during hot processing of that foam. Regardless of the particular time during which those emissions are generated, i.e., during foam preparation or during the preparation of products from such a foam after it is fully-formed, it was discovered that the quantity of emissions generated during those procedures can be reduced by contacting the emissions with vegetable oil.

It is not presently known precisely how, or why, the vegetable oil functions to remove these emissions, only that such oils do in fact function is this manner. It was further discovered that vegetable oils having certain physical characteristic provide enhanced performance in the inventive method. Advantageously, such oils may possess a heat stability that is sufficiently high so that it does not degrade into vaporous components when exposed to the temperatures generated by the foam during its preparation (up to about 170°–180° C.), or when exposed to the temperature of an exhaust airstream which contains the emissions (about 130°–140° C.). The heat stability of the oil may be determined by use of any number of well-known methods, e.g., differential thermal analysis, thermogravimetric analysis, or differential scanning calorimetry.

Preferably, the oils used in the inventive methods may further possess a boiling point of at least about 200° C., a vapor pressure of less than about 5 mm Hg, and a heat stability of at least about 260° C. Examples of oils which meet the aforesaid boiling point, vapor pressure, and heat stability requirements, and which are preferably used in the inventive method include, at least, soybean oil, epoxidized soybean oil, epoxidized linseed oil, epoxidized octyl soyate, linseed oil, and mixtures thereof.

Each aspect of the present method requires that the emissions be collected and transferred in some manner so that they can come into contact with the vegetable oil. Any conventional apparatus or methodology may be used to achieve this end, as will be readily appreciated by those skilled in the art. For example, during the preparation of foams, the foam production line may be at least partially enclosed along its top and sides. An exhaust air stream may then be drawn over the line to collect any emissions that emanate from the foam-forming formulation during foam preparation, i.e., from the time that the foam-forming composition is deposited onto a substrate until such time as the foam is finally cured. Of course, the exhaust air stream may be drawn over all or any part of the foam production line, e.g., over that part of the line where the composition has been deposited onto a substrate but has not yet begun to rise, over that part where the foam rises, and/or over that part where the foam has completed its rise and is curing. The selection as to which part of the line is to be at least partially covered will, or whether the entire line is to be covered, depends, of course, upon the particular degree of purity sought in the surrounding air. The same type of system may be utilized in situations where the foam is deposited, rises, and completes its rise at one location, but is subsequently transported to and cured at another location.

Once the exhaust air containing the emissions is collected, it can be contacted with the oil by any suitable method. Such methods, one of which employs the use of filtration media, are well known to those skilled in the art.

Advantageously, however, the vegetable oil may come into contact with the emissions by passing the emissions through a porous element containing the oil. Examples of suitable porous elements include cloth, woven fibers, bonded fiber, paper, fiberglass, expanded metal, and foams. That porous element preferably, however, comprises an open-celled foam, such as, e.g., polyurethane, urea formaldehyde, and phenol formaldehyde foams, with polyurethane foams being most preferred.

Generally, when filtration media are used, one should adhere to at least the following principles to ensure maximum removal efficiency: ensuring the laminar flow of exhaust air through the filter medium, ensuring the uniform flow of air across the entire surface of the medium, attaining the lowest practical pressure drop across the medium, providing the largest feasible medium contact area, and obtaining the lowest linear velocity of the air through the medium.

When a porous element is used as the carrier for the oil, the oil may be introduced into the element by any suitable means, e.g., by soaking, dipping, or spraying the oil onto the element. Alternatively, and advantageously when the element is a foam, the oil may be introduced into the foam by reacting the foam-forming components in the presence of the oil. This method of introducing the oil into the foam is preferred because it allows one to dispense with the extra step of soaking or dipping the foam in the oil when preparing an oil-laden porous foam filter medium.

When this approach is used, it has been found that one is limited to the use of epoxidized vegetable oils, and preferably epoxidized soybean oils. When other vegetable oils are used, one will not obtain a stable foam product. However, when the proper oils are used, one not only obtains a stable foam product, but is further provided with a foam which possesses demonstrably superior results in regard to at least its permeability. The use of epoxidized vegetable oils in this manner, and a more complete description of this and the other advantages flowing from the use of such oils, is set forth in the co-pending parent application, U.S. patent application Ser. No. 08/275,122, filed on Jul. 14, 1994.

Regardless of the manner in which the oil is introduced into the porous element, sufficient oil should be incorporated into the element so that the life of the filter is maximized without significantly degrading either the element's strength or interfering with the airflow through the element. In that regard, if too little oil is added, the elements will have limited capacity, requiring the element to be changed frequently. In contrast, if too much oil is added the element becomes sticky and may clog. Further, some of the oil may become entrained in the exhaust air stream. Both extremes should, therefore, be avoided.

In view of the foregoing considerations, the oil may advantageously be present in an amount which would provide at least a 70% reduction in the level of emissions in the exhaust air (as compared to untreated exhaust air), and most advantageously at least about a 90% reduction in that level. To achieve such levels, the oil advantageously may be present in an amount of from about 5 wt. % to about 25 wt. % of the combined weight of the porous element and oil. Most preferably, the oil may comprise about 8 wt. % to about 15 wt. % of the combined weight of the foam and oil.

The emissions generated during foam preparation, i.e., from the time the foam-forming composition is deposited onto a substrate, through the time it rises and until it becomes solid, self-supporting, and completes its rise, and until it is cooled and finally cured, are well-known to those skilled in the art. Generally, from the time the foam-forming process begins by the deposition of the foam-forming composition onto a substrate and as the reaction proceeds and the foam begins to rise, the volatile components present in the composition, as well as the new compounds produced form the reaction of certain of those foam-forming components, e.g., isocyanates, antioxidants and their degradation products, amines, blowing agents, flame retardant additives, plasticizers, impurities, and solvents, will enter the surrounding air.

As the composition completes its rise and reaches a self-sustaining configuration, i.e., the point at which the foam will not collapse under its own weight if left undisturbed, it will typically further emit a smoke comprised of fine particulates and vapors. The emission of this smoke generally lasts only for a short time, about one minute or so. However, trace emissions, including the aforedescribed smoke, will continue to be released into the air for several hours thereafter, i.e., during the subsequent cooling and curing of the foam.

The general composition of the vapors, both invisible and visible, and fine particulates which comprise the smoke are well-known in the art. While varying depending upon the precise foam-forming composition used, the particulates and vapors include, at least, particles of the foam itself, as well as unreacted components which remain within the foam, e.g., foam blowing agents and catalysts, and by-products formed during the reaction of the foam-forming composition. The particles will typically have average diameters of up to about 5 microns.

Similarly, those skilled in the art have general knowledge of the nature of the emissions generated during hot processing of a fully-formed foam, i.e., after the foam has been cured and is at about room temperature. Although the temperatures at which these components will be generated will vary depending upon the particular foam being processed, the generation of such emissions will generally occur when the foam is subjected to temperatures ranging above about its melt temperature, but below its combustion temperature. Such temperatures are generally considered to range from about 130° C. to about 400° C. Examples of the components which comprise such emissions include isocyanates, hydrocarbons, aldehydes, carbon dioxide, degradation products of flame retardants, smoke, and the like.

Foams are typically exposed to such emission-generating temperatures during fabrication processing. Examples of fabrication processes that will cause the aforesaid emissions to emanate from a fully-formed foam due to the exposure of the foam to such emission-generating temperatures include heat sealing, hot wire cutting, heat compression, heat lamination, surface melting (such as embossing), and flame lamination. All of these processes are well-known to those skilled in the art. These emissions will typically persist during the time the foam is heated, but will cease relatively quickly after the heat source is removed.

The inventive method may be used to the exclusion of other exhaust air purification devices and methods, or in combination with one or more of these devices and methods. If the inventive method is used in combination with at least one such device, e.g., a second filter comprising a carbon bed, the method may be advantageously performed on the emission-laden exhaust air stream upstream of that second filter. In this arrangement, the method of the present invention functions to pre-filter the air prior to its entry into the second filter. This results in extending the service life of the second filter, reducing the overall cost of air filtration. This becomes particularly important when the downstream filter is relatively expensive to replace.

The method of the present invention may find particular utility in the processing exhaust air streams generated in conjunction with "rapid cooling" processes. Examples of those processes are disclosed in U.S. Pat. Nos. 3,061,885, 3,890,414, 4,537,912, 5,128,379, and 5,223,552. The method of the present invention is advantageously used in connection with such processes because the active agent, the oil, is not affected by the presence of moisture in the exhaust air stream. As set forth previously, the inventive method may be used in place of, or in addition to, any of the devices and/or methods used for processing the exhaust air streams generated from the "rapid cooling" processes.

The following examples further illustrate the present invention but, of course, should not be construed as in any way limiting its scope.

EXAMPLE 1

This example evaluates the performance of a porous foam that has been soaked in an epoxidized soybean oil (PLAS-CHEK 775 available from Ferro Chemical) in reducing the quantity of emissions emanating from a polyurethane foam while that foam is subjected to "rapid cooling."

A flexible polyurethane filter foam (Velve ® foam, General Foam) was prepared. Four pieces of that filter foam (24½ × 24½ × 1) were soaked in epoxidized soybean oil such that the quantity of oil in the foam was 12 wt. %, based upon the total weight of foam and oil. The four pieces of oil-soaked filter foam were placed, in series, into a filter box.

Run A

A block of 3500 foam (a polyether foam available from General Foam of Hazleton, Pa.) having a density of about 0.9 lb/ft$^3$ and 30 IFD (a measure of foam firmness or load-bearing capability, as defined by ASTM D 3574-91) was prepared and subjected to the "rapid cooling" process described in U.S. Pat. No. 3,890,414. The cooling time of the block of 3500 foam to room temperature was 3 min., 24 sec. The emissions emanating from this foam during "rapid cooling" were passed through the filter box containing the oil-soaked filter foam. The quantity of emissions in the air exiting the filter box was observed and recorded.

During the "rapid cooling" process, the amount of smoke observed exiting the filter box was: no smoke for the first 45 secs., very light smoke for the next 75 secs., light smoke during the next 30 secs., with the smoke then disappearing.

Run B

A second block of 3500 foam was prepared and subjected to the "rapid cooling" process in the same manner as set forth in Run A. The cooling time of this block of 3500 foam to room temperature was 4 min., 45 sec. However, for this run, the four pieces of filter foam were not soaked in the oil prior to placement into the filter box. The quantity of emissions in the air exiting the filter box was again observed and recorded.

During the "rapid cooling" process, very dense smoke was observed exiting the filter box for the first 50 secs. A light smoke was observed for the next 40 sees. Only a trace of smoke was observed for the next 20 secs., with the smoke then disappearing.

The relative reduction in smoke density of the air exiting the filter box using the oil-laden filter foam (Run A), as compared to using the filter foam alone (Run B), ranged from about 90% to 95%, based upon visual estimates combining both intensity of the visible smoke and its duration.

EXAMPLE 2

This example evaluates the performance of a porous polyurethane foam that has been prepared by the in situ reaction of a foam-forming composition which includes epoxidized soybean oil in reducing the quantity of emissions emanating from a polyurethane foam while that foam is subjected to "rapid cooling."

A flexible polyurethane filter foam was prepared by the in situ reaction of a foam-forming composition which included the components set forth in Table A.

TABLE A

| Component | pHR |
|---|---|
| TDI 80/20[1] | 46 |
| Index[2] | 110 |
| L560[3] | 1.0 |
| UL-5[4] | 0.2 |
| Yellow/1100-220 (.5/1.5)[5] | 2.0 |
| C-232[6] | 0.25 |
| Water | 3.4 |
| P-775[7] | 15 |
| P-53[8] | 100 |

[1]TDI 80/20 is a mixture of 80% of the 2,4-isomer and 20% of the 2,6-isomer of toluene diisocyanate.
[2]Index is the ratio of actual isocyanate used to that which is stoichiometrically required.
[3]L-560 (OSI Chemical) is a polyether silicone surfactant.
[4]UL-5 (Witco Chemical Company) is dibutyl tin dilaurate (50%) in di(2-ethylhexylphthalate) (50%).
[5]1100-220 (Inolex) is a low molecular weight polyester. This polyester is used as a diluent for the yellow dye ("Yellow") which dye is available from Milliken Chemical.
[6]C-232 (Air Products & Chemicals) is a tertiary amine catalyst comprising a blend of three parts bis (2-dimethyl aminoethyl) ether 70% in dipropylene glycol and one part diethylene-triamine 33% in propylene glycol 67%.
[7]P-775 (Ferro Chemical) is an epoxidized soybean oil.
[8]F-53 (Foamrez F-53, Witco Chemical) is a polyester polyol.

The resulting filter foam was cut into four pieces (each 24½ × 24½ × 1) and placed, in series, into a filter box.

Run C

A block of 3500 foam was prepared and subjected to the "rapid cooling" process in the same manner as in Example 1. The cooling time of the block of 3500 foam to room temperature was 4 min, 30 sec. The emissions emanating from this foam during "rapid cooling" were passed through the filter box containing the oil-laden filter foam. The quantity of emissions in the air exiting the filter box was observed and recorded.

During the "rapid cooling" process, no visible smoke was observed exiting the filter box for the first 60 secs. A trace of smoke was observed for the next 90 secs. The smoke became slightly more dense during the next 30 secs., reduced to a trace during the next 30 secs., and then disappeared.

Run D

A second block of 3500 foam was prepared and subjected to the "rapid cooling" process in the same manner as set forth in Run C. The cooling time of this block of 3500 foam to room temperature was 4 min, 45 sec. However, for this run, no filters of any type were placed into the filter box. The quantity of emissions in the air exiting the filter box during the "rapid cooling" process was again observed and recorded.

During the "rapid cooling" process, very heavy, dense smoke was observed exiting the filter box for the first 50 secs. A light smoke was observed for the next 30 secs. A trace of smoke was observed for the next 30 secs., with the smoke then disappearing.

The relative reduction in smoke density of the air exiting the filter box using the oil-laden filter foam prepared by an in situ process (Run C), as compared to using no filter foam (Run D), ranged from about 90% to 95%.

EXAMPLE 3

The procedures set forth in Example 1 were repeated. However, for Run E of this example, the porous foam was soaked in an epoxidized octyl soyate (VIKOFLEX 4050, available from Elf Atochem) instead of epoxidized soybean oil. The quantity of soyate in the foam was about 11 wt. % based upon the total weight of foam and oil. For Run F, no filters of any type were placed into the filter box.

Run E

The block of 3500 foam was cooled to room temperature is about 5 min. During the "rapid cooling" of the 3500 foam, no visible smoke was observed exiting the filter box for the first 30 secs. A trace of smoke was observed for the next 20 secs. The smoke became very light during the next 70 secs., declined to a trace during the next 30 secs., and then disappeared.

Run F

A second block of 3500 foam was cooled to room temperature in about 5 min. During the "rapid cooling" of this block, very heavy, dense smoke was observed exiting the filter box for the first 50 secs. A light smoke was observed for the next 20 secs. Only a trace of smoke was observed for the next 20 secs., with the smoke then disappearing.

The relative reduction in smoke density of the air exiting the filter box using the soyate-laden filter foam (Run E), as compared to using no filter foam at all (Run F), ranged from about 90% to 95%.

EXAMPLE 4

The procedures set forth in Example 1 were repeated. However, for Run G of this example, the porous foam was soaked in an epoxidized linseed oil (VIKOFLEX 7190, available from Elf Atochem) instead of epoxidized soybean oil. The quantity of linseed oil in the foam was about 11 wt. %, based upon the total weight of foam and oil. For Run H, no filters of any type were placed into the filter box.

Run G

The block of 3500 foam was cooled to about room temperature is about 6 min. During the "rapid cooling" of the 3500 foam, no visible smoke was observed exiting the filter box for the first 15 secs. A trace of smoke was observed for the next 15 secs. The smoke became very light during the next 15 secs., medium light for the next 30 secs., medium density for 15 secs., became light for the next 45 secs., declined to a trace during the next 45 secs., and then disappeared.

Run H

A second block of 3500 foam was cooled to about room temperature in about 6 min. During the "rapid cooling" of this block, very heavy, dense smoke was observed exiting the filter box for the first 55 secs. A medium density smoke was observed for the next 10 secs. Only light smoke was observed for the next 15 secs., a trace remained for the next 20 secs., with the smoke then disappearing.

The relative reduction in smoke density of the air exiting the filter box using the epoxidized linseed oil-laden filter foam (Run G), as compared to using no filter foam at all (Run H), was about 75%.

EXAMPLE 5

The procedures set forth in Example 1 were repeated. However, for Run I of this example, the porous foam was soaked in soybean oil instead of epoxidized soybean oil. The quantity of soybean oil in the foam was about 11 wt. %, based upon the total weight of foam and oil. For Run J, same porous foam used in Run I was used.

Run I

The block of 3500 foam was cooled to about room temperature is about 5 min. During the "rapid cooling" of the 3500 foam, no visible smoke was observed exiting the filter box for the first 20 secs. Very light smoke was observed for the next 100 secs., with the smoke then disappearing.

Run J

A second block of 3500 foam was cooled to about room temperature in about 5 min. During the "rapid cooling" of this block, no visible smoke was observed exiting the filter box for the first 20 secs. Very light smoke was observed for the next 70 secs., a trace remained for the next 30 secs., with the smoke then disappearing.

The relative reduction in smoke density of the air exiting the filter box using the soybean oil-laden filter foam (Run I), as compared to the reduction achieved using that same filter foam a second time (Run J), was very similar. The use of soybean oil produced the best results of all oils tested.

EXAMPLE 6

The procedures set forth in Example 1 were repeated. However, for Run K of this example, the porous foam was soaked in epoxidized soybean oil (VIKOFLEX 7170, available from Elf Atochem) which was obtained from a source that is different from the source of the oil used in Example 1. The quantity of epoxidized soybean oil in the foam was about 11 wt % based upon the total weight of foam and oil For Run L, no filters of any type were placed into the filter box.

Run K

The block of 3500 foam was cooled to about room temperature is about 6 min. During the "rapid cooling" of the 3500 foam, no visible smoke was observed exiting the filter box for the first 30 secs. A trace of smoke was observed for the next 30 secs. The smoke became very light during the next 100 sees., declined to a trace during the next 30 secs., and then disappeared.

Run L

A second block of 3500 foam was cooled to about room temperature in about 6 min. During the "rapid cooling" of this block, very heavy, dense smoke was observed exiting the filter box for the first 55 secs. Only light smoke was observed for the next 20 secs., very light smoke during the next 15 secs., a trace for the next 30 secs., with the smoke then disappearing.

The relative reduction in smoke density of the air exiting the filter box using the epoxidized soybean oil-laden filter foam (Run K), as compared to using no filter foam at all (Run L), was about 80%.

EXAMPLE 8

The procedures set forth in Example 1 were repeated, with the exception that, for Run M, a single 24"×20"×2" air filter comprised of synthetic fibers (Newtron), and coated 20 g on each side of the filter with epoxidized soybean oil (PLAS-CHEK 775), was placed onto the filter box. The quantity of that oil in the foam was about equal to the amount of oil used to impregnate the foam samples in the prior examples. For Run N, no filters of any type were placed into the filter box.

Run M

The block of 3500 foam was "rapid cooled" to room temperature in about 4 minutes. During this "rapid cooling," very heavy smoke was visible for the first 40 secs., light density smoke was observed for the next 30 secs., and a trace during the next 40 secs., with the smoke then disappearing.

Run N

A second block of 3500 foam was "rapid cooled" to room temperature in about 5 minutes. During the "rapid cooling," very heavy, dense smoke was observed exiting the filter box for the first 55 secs. Medium-light smoke was observed for the next 15 secs., and a trace for the next 40 secs., with the smoke then disappearing.

The relative reduction in smoke density of the air exiting the filter box using the epoxidized soybean oil-coated filter (Run M), as compared to using no filter foam at all (Run N), was found to be very slight. It is believed that no increase in performance would be obtained by increasing the area or number of coated filters because of the likely excessive increase in pressure drop across the filters.

COMPARATIVE EXAMPLE 1

The procedures set forth in Example 1 were repeated. However, for Run O of this example, the porous foam was soaked in a synthetic, non-vegetable oil, more specifically, an alkylsulfonic acid ester of phenol (MESAMOL, available from Miles). The quantity of that oil in the foam was about 11 wt. %, based upon the total weight of foam and oil. For Run P, no filters of any type were placed into the filter box.

Run O

The block of 3500 foam was "rapid cooled" to room temperature in about 5 minutes. During this "rapid cooling," no visible smoke was observed exiting the filter box for the first 20 secs. A trace of smoke was observed for the next 20 secs. The smoke became very light during the next 20 secs., declined to very, very light during the next 20 secs., became light for the next 20 secs., medium light for the next 40 secs., a trace during the next 30 secs., and then disappeared.

Run P

A second block of 3500 foam was "rapid cooled" to room temperature in about 4 minutes. During the "rapid cooling," very heavy, dense smoke was observed exiting the filter box for the first 55 secs. Only medium-light smoke was observed for the next 10 secs., light smoke during the next 10 secs., and a trace for the next 20 secs., with the smoke then disappearing.

The relative reduction in smoke density of the air exiting the filter box using the MESAMOL oil-laden filter foam (Run O), as compared to using no filter foam at all (Run P), was about 80%.

Comparative Example 2

The procedures set forth in Example 1 were repeated. However, for Run Q of this example, the porous foam was soaked in a light mineral oil (KAYDOL, available from Witco). The quantity of that oil in the foam was about 11 wt. %, based upon the total weight of foam and oil. For Run R, no filters of any type were placed into the filter box.

Run Q

The block of 3500 foam was "rapid cooled" to room temperature in about 6 minutes. During this "rapid cooling," no visible smoke was observed exiting the filter box for the first 15 secs. Light smoke was observed for the next 25 secs. The smoke became medium density during the next 50 secs., medium to heavy for the next 40 secs., light density during the next 20 secs., declined to a trace for the next 40 secs., and then disappeared.

Run R

A second block of 3500 foam was "rapid cooled" to room temperature in about 6 minutes. During the "rapid cooling," very heavy, dense smoke was observed exiting the filter box for the first 55 secs. Only medium density smoke was observed for the next 15 secs., medium-light smoke during the next 10 secs., light smoke during the next 10 secs., and a trace for the next 15 secs., with the smoke then disappearing.

The relative reduction in smoke density of the air exiting the filter box using the light mineral oil-laden filter foam (Run Q), as compared to using no filter foam at all (Run R), was not significant. It appeared that the smoke was merely dispersed over a relatively longer period of time, with only a slight reduction in quantity.

COMPARATIVE EXAMPLE 3

The procedures set forth in Example 1 were repeated. However, for Run S of this example, the porous foam was soaked in a non-vegetable oil, diisononyl phthalate (DINP, available from BASF). The quantity of the phthalate in the foam was about 11 wt. %, based upon the total weight of foam and the phthalate. For Run T, no filters of any type were placed into the filter box.

Run S

The block of 3500 foam was "rapid cooled" to room temperature in about 5.5 minutes. During this "rapid cooling," no visible smoke was observed exiting the filter box for the first 10 secs. Light density smoke was observed for the next 10 secs. The smoke became medium density during the next 20 secs., medium to heavy for the next 50 secs., heavy during the next 30 secs., light density during the next 30 secs., declined to a trace for the next 30 secs., and then disappeared.

Run T

A second block of 3500 foam was "rapid cooled" to room temperature in about 4 minutes. During the "rapid cooling," very heavy, dense smoke was observed exiting the filter box for the first 50 secs. Only medium density smoke was observed for the next 15 secs., light smoke during the next 20 secs., a trace for the next 30 secs., with the smoke then disappearing.

The relative reduction in smoke density of the air exiting the filter box using the phthalate-laden filter foam (Run S), as compared to using no filter foam at all (Run T), was not significant.

EXAMPLE 9

The procedures set forth in Example 1 were repeated a number of times in order to determine the life of a soybean oil-laden filter. The filter foam used in this Example was identical to the foam used in Example 1, except that the vegetable oil used here is soybean oil as opposed to epoxidized soybean oil.

In order to determine the filter life, a single set of filters was prepared in the manner described in this example and inserted into the filter box. Those filters remained in the box while a series of 3500 foam pieces were subjected to "rapid cooling" in a sequential manner. Observations as to the quantity of emissions exiting the filter box during the cooling of the fourth through fourteenth foam piece were recorded.

The single set of filters used during this Example were prepared by soaking the porous foam in soybean oil, instead of epoxidized soybean oil as in Example 1.

The quantity of soybean oil in the foam after soaking was about 11 wt. %, based upon the total weight of foam and oil.

Run U: Filter Foam Subjected to Four "Rapid Cooling" Cycles

Four "Rapid Cooling" procedures were conducted, with the exhaust air therefrom being passed through the filter box containing the filter foam. The fourth "Rapid Cooling" was initiated about 15 mins. after removing the foam from the production line. The foam was cooled to room temperature within about 5 mins. After cooling was started, no visible smoke was observed exiting the filter box for the first 20 secs. A trace of smoke was observed for the next 25 secs. The smoke had a very light density during the next 35 secs., light for the next 50 secs., declined to a trace for the next 50 secs., and then disappeared.

The resulting reduction in quantity of smoke was not as good as the initial three runs, but remained very significant (about 90%) compared to control runs with no filters installed.

Run V: Filter Foam Subjected to Five "Rapid Cooling" Cycles

The fifth "Rapid Cooling" was initiated about 22 mins. after removing the foam from the production line. The foam was cooled to room temperature within about 4 mins. After cooling was started, no visible smoke was observed exiting the filter box for the first 20 secs. A trace of smoke was observed for the next 15 secs. The smoke had a light density during the next 25 secs., became slightly more dense for the next 20 secs., became light to medium for the next 40 secs., very light during the next 10 secs., a trace for 50 secs., and then vanished.

While a slight increase in the quantity of smoke over that observed after four cycles was noted, the reduction of smoke during this fifth cycle was significant as compared to the level of smoke observed being emitted without using any filters.

Run W: Filter Foam Subjected to Six "Rapid Cooling" Cycles

The sixth "Rapid Cooling" was initiated about 19 mins. after removing the foam from the production line. The foam was cooled to room temperature within about 5 mins. After cooling was started, no visible smoke was observed exiting the filter box for the first 25 secs. A trace of smoke was observed for the next 20 secs. The smoke had a very light density during the next 30 secs., had a light density for the next 45 secs., a trace for 70 Secs., and then vanished.

The density and duration of the smoke was similar to that observed during the third cycle.

Run X: Filter Foam Subjected to Seven "Rapid Cooling" Cycles

The seventh "Rapid Cooling" was initiated about 19 mins. after removing the foam from the production line. The foam was cooled to room temperature within about 5 mins. After cooling was started, no visible smoke was observed exiting the filter box for the first 25 secs. A trace of smoke was observed for the next 15 secs. The smoke had a very light density during the next 20 secs., had a light density for the next 20 secs., light to medium density for the next 40 secs., a trace for 40 secs., and then vanished.

The density of the smoke increased as compared to that observed during the previous cycle, but remained significantly less than that observed without the use of any filters.

Run Y: Filter Foam Subjected to Eight "Rapid Cooling" Cycles

The eighth "Rapid Cooling" was initiated about 30 mins. after removing the foam from the production line. The foam was cooled to room temperature within about 5 mins. After cooling was started, no visible smoke was observed exiting the filter box for the first 25 secs. A trace of smoke was observed for the next 15 secs. The smoke had a very light density during the next 60 secs., was reduced to a trace for the next 20 secs., and then vanished.

The density of the smoke decreased overall as compared to the sixth and seventh cycles. This was attributable to the increased time the foam was allowed to cure before rapid cooling was initiated (about 30 mins. versus about 19 mins. )

Run Z: Filter Foam Subjected to Nine "Rapid Cooling" Cycles

The ninth "Rapid Cooling" was initiated about 6 mins. after removing the foam from the production line. The foam was cooled to room temperature within about 4 mins. After cooling was started, no visible smoke was observed exiting the filter box for the first 15 secs. A trace of smoke was observed for the next 20 secs. The smoke had a very light density during the next 15 secs., had a light to medium density for the next 55 secs., a very light density for the next 20 secs., a trace for 45 secs., and then vanished.

The density of the smoke increased as compared to that observed during the sixth cycle, but remained significantly less than that observed without the use of any filters.

Run AA: Filter Foam Subjected to Ten "Rapid Cooling" Cycles

The tenth "Rapid Cooling" was initiated about 20 mins. after removing the foam from the production line. The foam was cooled to room temperature within about 4 mins. After cooling was started, no visible smoke was observed exiting the filter box for the first 20 secs. A trace of smoke was observed for the next 15 secs. The smoke had a very light density during the next 20 secs., had a light density for the next 15 secs., light to medium density for the next 50 secs., very light density for the next 40 secs., a trace for 40 secs., and then vanished.

The density of the smoke was similar to that observed during the ninth cycle.

Run BB: Filter Foam Subjected to Eleven "Rapid Cooling" Cycles

The eleventh "Rapid Cooling" was initiated about 30 mins. after removing the foam from the production line. The foam was cooled to room temperature within about 5 mins. After cooling was started, no visible smoke was observed exiting the filter box for the first 30 secs. A trace of smoke was observed for the next 15 secs. The smoke had a very light density during the next 15 secs., had a light to medium density for the next 45 secs., a trace for 15 secs., and then vanished.

The reduction in the quantity of smoke over that observed during the ninth and tenth cycles was at least partially attributed to the length of time between the removal of the foam from the production line and the start of "Rapid Cooling."

Run CC: Filter Foam Subjected to Twelve "Rapid Cooling" Cycles

The twelfth "Rapid Cooling" was initiated about 6 mins. after removing the foam from the production line. The foam was cooled to room temperature within about 4 mins. After cooling was started, no visible smoke was observed exiting the filter box for the first 10 secs. A trace of smoke was observed for the next 20 secs. The smoke had a very light density during the next 15 secs., had a light density for the next 60 secs., a trace for 55 secs., and then vanished.

The density of the smoke was slightly greater than that observed during the ninth cycle. This was possibly due to the cleanout of the filter chamber between runs.

Run DD: Filter Foam Subjected to Thirteen "Rapid Cooling" Cycles

The thirteenth "Rapid Cooling" was initiated about 18 mins. after removing the foam from the production line. The foam was cooled to room temperature within about 4 mins. After cooling was started, no visible smoke was observed exiting the filter box for the first 15 secs. A trace of smoke was observed for the next 10 secs. The smoke had a light density during the next 15 secs., had a medium density for the next 65 secs., a trace for 55 secs., and then vanished.

The density of the smoke was similar to that observed during the twelfth cycle, but its duration was slightly less.

Run EE: Filter Foam Subjected to Fourteen "Rapid Cooling" Cycles

The fourteenth "Rapid Cooling" was initiated about 30 mins. after removing the foam from the production line. The foam was cooled to room temperature within about 4 mins. After cooling was started, no visible smoke was observed exiting the filter box for the first 25 secs. A trace of smoke was observed for the next 10 secs. The smoke had a light density during the next 55 secs., a trace for 35 secs., and then vanished.

The density of the smoke was similar to that observed during the prior tests in which the foam was "Rapid Cooled" about thirty minutes after being taken off the production line. While a gradual loss in smoke removal effectiveness was noted over the fourteen cycle test, the filter foams impregnated with soybean oil remained effective in reducing the quantity of smoke emitted during the "Rapid Cooling" process even after fourteen cycles.

All of the references, patents, and applications cited herein are hereby incorporated in their entireties by reference.

While this invention has been described with an emphasis upon a preferred embodiment, it will be obvious to those of ordinary skill in the art that variations of the preferred products and methods may be used and that it is intended that the invention may be practiced otherwise than as specifically described herein. Accordingly, this invention includes all modifications encompassed within the spirit and scope of the invention as defined by the following claims.

What is claimed is:

1. A method for reducing the quantity of emissions emanating from a polyurethane foam-forming composition during the preparation of a fully-cured foam comprising contacting emissions emanating from the polyurethane foam-forming composition during preparation of the fully-cured foam with vegetable oil.

2. The method according to claim 1, wherein the vegetable oil has a boiling point of at least about 200° C., a vapor pressure of less than about 5 mm Hg, and a heat stability of at least about 260° C.

3. The method according to claim 2, wherein the vegetable oil is selected from the group consisting of soybean oil, epoxidized soybean oil, epoxidized linseed oil, epoxidized octyl soyate, linseed oil, and mixtures thereof.

4. The method according to claim 1, wherein the vegetable oil is contacted with the emissions by passing the emissions through a porous element containing the oil.

5. The method according to claim 4, wherein the porous element is a porous foam.

6. The method according to claim 5, wherein the porous foam containing the oil is prepared by soaking the foam in the oil.

7. The method according to claim 5, wherein the porous foam containing the oil is prepared by reacting foam-forming components in the presence of the oil.

8. The method according to claim 4, wherein the oil is present in an amount sufficient to reduce the level of emissions by at least about 70%.

9. The method according to claim 4, wherein the oil is present in an amount of from about 5 wt. % to about 25 wt. % based upon the combined weight of the foam and oil.

10. The method according to claim 4, wherein the oil is present in an amount sufficient to reduce the level of emissions by at least about 90%.

11. The method according to claim 4, wherein the oil is present in an amount of from about 8 wt. % to about 15 wt. % based upon the combined weight of the foam and oil.

12. The method according to claim 1, wherein the emissions emanating from the composition prior to rising of the composition are contacted with vegetable oil.

13. The method according to claim 1, wherein the emissions emanating from the composition during rising of the composition are contacted with vegetable oil.

14. The method according to claim 1, wherein the emissions emanating from a foam formed from the composition are contacted with vegetable oil during curing of the foam.

15. A method for reducing the quantity of emissions emanating from a fully-formed polyurethane foam during hot processing of the foam comprising contacting emissions emanating from the polyurethane foam during hot processing with vegetable oil.

16. The method according to claim 15, wherein the vegetable oil has a boiling point of at least about 200° C., a vapor pressure of less than about 5 mm Hg, and a heat stability of at least about 260° C.

17. The method according to claim 16, wherein the vegetable oil is selected from the group consisting of soybean oil, epoxidized soybean oil, epoxidized linseed oil, epoxidized octyl soyate, linseed oil, and mixtures thereof.

18. The method according to claim 15, wherein the vegetable oil is contacted with the emissions by passing the emissions through a porous element containing the oil.

19. The method according to claim 18, wherein the porous element is a porous foam.

20. The method according to claim 19, wherein the porous foam containing the oil is prepared by soaking the foam in the oil.

21. The method according to claim 19, wherein the porous foam containing the oil is prepared by reacting foam-forming components in the presence of the oil.

22. The method according to claim 18, wherein the oil is present in an amount sufficient to reduce the level of emissions by at least about 70%.

23. The method according to claim 18, wherein the oil is present in an amount of from about 5 wt. % to about 25 wt. % based upon the combined weight of the foam and oil.

24. The method according to claim 18, wherein the oil is present in an amount sufficient to reduce the level of emissions by at least about 90%.

25. The method according to claim 18, wherein the oil is present in an amount of from about 8 wt. % to about 15 wt. % based upon the combined weight of the foam and oil.

26. The method according to claim 15, wherein the hot processing is flame laminating, heat compressing, hot wire cutting, heat skinning, or heat laminating.

* * * * *